(12) United States Patent
Wang

(10) Patent No.: US 9,842,375 B2
(45) Date of Patent: Dec. 12, 2017

(54) FLEXIBLE FARE BUS FRAMEWORK TO REDUCE BUS BUNCHING

(71) Applicant: SAP SE, Walldorf (DE)

(72) Inventor: Ting Wang, Singapore (SG)

(73) Assignee: SAP SE, Walldorf (DE)

( * ) Notice: Subject to any disclaimer, the term of this patent is extended or adjusted under 35 U.S.C. 154(b) by 770 days.

(21) Appl. No.: 14/277,797

(22) Filed: May 15, 2014

(65) Prior Publication Data

US 2015/0332354 A1    Nov. 19, 2015

(51) Int. Cl.
*G06Q 50/30* (2012.01)
*G06Q 10/06* (2012.01)
*G06Q 30/02* (2012.01)

(52) U.S. Cl.
CPC ............ *G06Q 50/30* (2013.01); *G06Q 10/06* (2013.01); *G06Q 10/063* (2013.01); *G06Q 30/02* (2013.01); *G06Q 30/0283* (2013.01)

(58) Field of Classification Search
CPC ........ G06Q 10/06; G06Q 30/02; G06Q 50/30; G06Q 10/063; G06Q 10/0283
USPC .......................................................... 705/13
See application file for complete search history.

(56) References Cited

U.S. PATENT DOCUMENTS

| 5,485,347 | A  | * | 1/1996 | Miura ................ | G06M 1/101 104/28 |
| 2003/0139941 | A1 | * | 7/2003 | Matsumoto ............ | G06Q 30/02 705/13 |
| 2010/0153125 | A1 | * | 6/2010 | Hamilton, II ......... | G06Q 50/30 705/1.1 |
| 2014/0074757 | A1 | * | 3/2014 | De Gennaro .......... | G07B 13/04 705/417 |
| 2014/0197967 | A1 | * | 7/2014 | Modica ................. | G08G 1/09 340/932 |
| 2015/0294430 | A1 | * | 10/2015 | Huang .................. | G06Q 50/26 705/7.24 |
| 2015/0294566 | A1 | * | 10/2015 | Huang ................. | G05D 1/0261 701/41 |

FOREIGN PATENT DOCUMENTS

WO    WO 2013096675 A1 *  6/2013    ....... G08G 1/096716

OTHER PUBLICATIONS

Kittelson & Associates, Inc. Transit Capacity and Quality of Service Manual—Part 2: Bus Transit Capacity, Jan. 1999, pp. 2-7 to 2-8.*
Risk Waters Group. Communications: Dart Conveys Info to Transit Riders With Mobile LEDs, IVHS vol. 2.15, Jul. 20, 1992.*
Joshua Michael Pilachowski, An approach to reducing bus bunching, UCTC Dissertation, 2009, No. 165, University of California, Berkeley.

(Continued)

*Primary Examiner* — Kevin H Flynn
*Assistant Examiner* — Hunter A Molnar

(57) ABSTRACT

Disclosed herein are technologies for implementing a Flexible Fare Bus framework to reduce bus bunching Particularly, the Flexible Fare Bus framework focuses on fixing a demand of passengers from passenger's side by dynamically adjusting a pre-determined headway-threshold throughout a pre-defined bus route. This Abstract is submitted with the understanding that it will not be used to interpret or limit the scope or meaning of the claims.

18 Claims, 4 Drawing Sheets

(56) References Cited

OTHER PUBLICATIONS

John J. Bartholdi, III, A self-coórdinating bus route to resist bus bunching, Transportation Research Part B, 2011, pp. 1-26, USA.
Carlos F. Daganzo et al., Reducing bunching with bus-to-bus cooperation, Dec. 2009, pp. 1-17, USA.
C. David Emele et al., Agent-driven variable pricing in flexible rural transport services, Communications in Computer and Information Science, 2013, pp. 1-12, vol. 365, United Kingdom.
Luis Moreira-Matias et al., Bus Bunching Detection: A Sequence Mining Approach, Workshop on Ubiquitous Data Mining, 2012, pp. 13-17, France.
Giuseppe Bellei et al., Transit vehicles' headway distribution and service irregularity, Public Transport, Jul. 2010, pp. 269-289, Springer-Verlag.
Carlos Gershenson et al., Why Does Public Transport Not Arrive on Time? The Pervasiveness of Equal Headway Instability, Oct. 2009, pp. 1-15, vol. 4, Issue 10, PLoS ONE.
Xing Zhe, Bus Bunching Solutions, 2014, pp. 1-17, SAP AG.
Andre Ampelas, Automatic Fare Collection, IEEE Intelligent Transportation Systems Conference Proceedings, Aug. 2001, pp. 1164-1166, Oakland, USA.
Wen Jin et al., The Design and Implementation of Smart Bus Stop in Shenzhen City, Science Technology and Engineer, 2004, vol. 4, Issue 10, Shenzhen.

\* cited by examiner

FLEXIBLE FARE BUS FRAMEWORK TO REDUCE BUS BUNCHING

TECHNICAL FIELD

The present disclosure relates generally to a Flexible Fare Bus framework to reduce bus bunching.

BACKGROUND

In a public transport, bus bunching (i.e., clumping, convoying, or platooning) may refer to a group of two or more transit vehicles (such as buses or trains), which were scheduled to be evenly spaced running along the same route, are running instead within the same location at the same time. This occurs when at least one of the vehicles is unable to keep up to its schedule and therefore ends up in the same location with the other one or more other vehicles that are plying the same route. The end result may be unreliable service and longer effective waiting times for some passengers on routes that had nominally shorter scheduled intervals.

Another unfortunate result may be the occurrence of overcrowded vehicles followed closely by near-empty ones. To eliminate or reduce this problem, various solutions have been proposed over the last few decades. In particular, bus routing, bus stop planning, and bus scheduling are some of the typical approaches that have been studied extensively.

In recent years, with the advances in computer science, new technologies have been developed and adopted for handling the bus bunching problem. For example, forecasting of bus bunching could become more accurate when trends can be deduced from historical data. However, empirical evidence has shown that the problem is not well solved yet.

SUMMARY

Disclosed herein is a Flexible Fare Bus framework to reduce bus-bunching. One aspect of the present framework includes receiving a first location and a first boarding-passenger load of a first bus, and receiving a second location and a second boarding-passenger load of a second bus to determine a headway based upon the first and the second locations. The headway may be compared to a headway-threshold, which includes a minimum determined headway before a bus-bunching occurrence. A fare adjustment may be determined in response to a comparing result that the determined headway is lesser than the headway-threshold.

In accordance with another aspect, the framework includes a bus-sensor data receiver that receives a first location and a boarding-passenger load of a first bus. The bus-sensor data receiver further receives a second location and a second boarding-passenger load of a second bus. A Flexible Fare Bus processor determines a headway based on the received first and second locations, and compares the determined headway to a headway-threshold that includes a minimum determined headway before a bus-bunching occurrence. A fare-adjustment component may facilitate a signal to indicate a bus fare that includes a determined discounted bus fare in response to a comparing result that the determined headway is lesser than the headway-threshold.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for a method of implementing a Flexible Fare (FlexiFare) algorithm to reduce bus bunching problem. Examples of users include individuals, business or corporate entities, etc. Technologies herein may be applied to computing and mobile applications.

Figure 1:
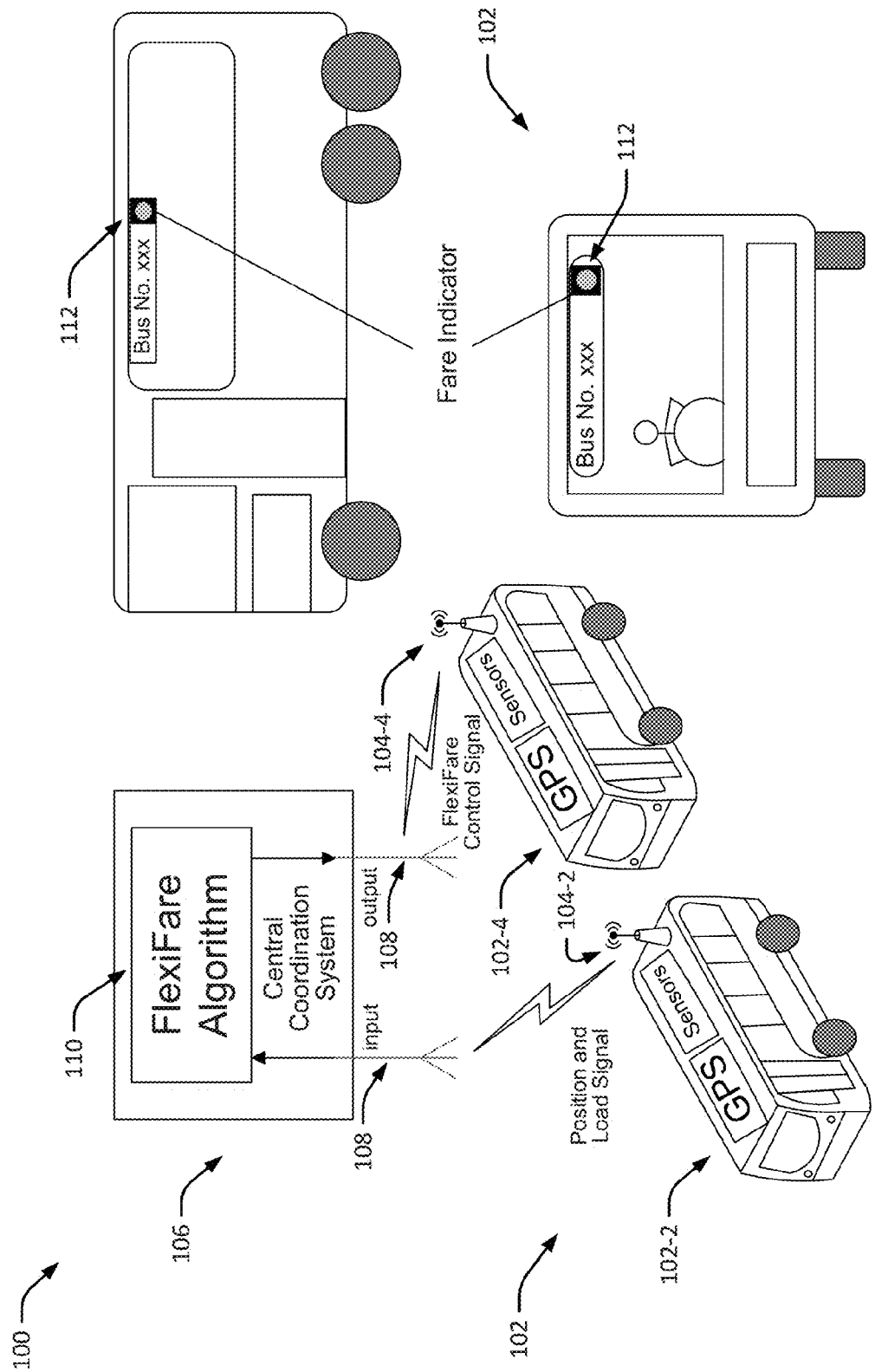
FIG. 1 illustrates an exemplary scenario that illustrates a Flexible Fare Bus algorithm application as described in present implementations herein.

FIG. 1 shows an example scenario 100 that illustrates an application of a Flexible Fare (FlexiFare) Bus algorithm as described in present implementations herein. As shown, the scenario 100 includes a first bus 102-2 with a first sensor 104-2, a second bus 102-4 with a second sensor 104-4, a control center 106 and a network signal 108 that provides a communication link between buses and the control center 106. Furthermore, the scenario 100 includes an implementation of a software-based Flexible Fare (FlexiFare) Bus algorithm 110 that is configured to reduce bus-bunching within a particular route as further discussed below.

As an initial overview of the scenario 100, the Flexible Fare (FlexiFare) Bus algorithm 110 supports a bus-bunching reduction between a plurality of buses 102 that ply a pre-defined bus route. For example, if ten buses 102 are plying a one hundred miles—route that includes ten bus terminal stations (i.e., bus stops), the Flexible Fare (FlexiFare) Bus algorithm 110 performs an algorithm to direct the bus speed, passenger to be loaded, bus fare discounts to be charged, and the like, for each of the buses 102. The direction may take the form of a real-time recommendation and a driver of the bus 102, for example, may manually apply the desired bus speed as recommended. In another example, an automated fare collection at the bus terminal station may implement the recommended bus fare discounts. In another example still, an automated boarding-passenger detector at the vehicle entrance or bus terminal station departure area may implement the recommended number of passengers to be loaded, for example, at next bus stop.

As illustrated in FIG. 1, the buses 102-2 and 102-4 are travelling in the same direction and along the same pre-defined bus route with the first bus 102-2 leading the second bus 102-4. In this setup, the sensors 104-2 and 104-4 of the buses 102 continuously updates the control center 106 with regard to their respective bus speeds, bus locations and current boarding-passenger loads. The continuous update may take the form of an input network signal 108 while the real-time recommendations from the control center 106 may take the form of an output network signal 108.

The control center 106 receives the current locations of the buses 102 and utilizes the received current locations as an input to the Flexible Fare (FlexiFare) Bus algorithm 110. Furthermore, the control center 106 receives the boarding-passenger loads and communicates this information as another input variable to the Flexible Fare (FlexiFare) Bus algorithm 110.

In an implementation, the Flexible Fare (FlexiFare) Bus algorithm 110 is configured to calculate a planned headway between a starting point and an ending point of the pre-defined bus route. For example, the starting point is a first bus terminal station (not shown) where the buses 102 begin to board passengers while the ending point is a last bus terminal station (not shown) in the pre-defined bus route where the buses 102 may drop their passenger(s). In this example, a plurality of other bus terminal stations (not shown) may be located in between. In another example, the pre-defined bus route is a continuous loop so that the first and last bus terminal stations are one and the same.

As described in present implementations herein, the planned headway may include an ideal average time interval to observe between successive buses 102 in order to avoid bus bunching. For example, the Flexible Fare (FlexiFare) Bus algorithm 110 uses the planned headway as a reference point for a dynamic adjustment of real-time recommendations regarding bus' speed, route, direction, and passenger loading. In this example, the Flexible Fare (FlexiFare) Bus algorithm 110 organizes and controls the speed of each bus 102, changes the direction of each bus if situation requires, the number of passengers to be loaded, and the like, based upon information received from the sensors 104-2 and 104-4 of the buses 102.

For example, when a deviation occurs due to speed, boarding-passenger load, and current location of the bus 102, the Flexible Fare (FlexiFare) Bus algorithm 110 is configured to send in real-time the recommendations to the bus 102. The real-time recommendation may take the form of charging a discounted bus fare, for example, at a next bus terminal station. In this example, the real-time recommendation is implemented by activating a signal-light (e.g., signal light 112) at visible corners of the bus 102.

In another example, the real-time recommendation may include charging a normal bus fare for the leading bus 102-2 while the lagging bus 102-4 may charge the discounted bus fare. In this example, the leading bus 102-2 may be delayed from a desired arrival to a subsequent bus terminal station and as such, the real-time recommendation may have the effect of advising the passengers at the subsequent bus terminal station to refrain from boarding the leading bus 102-2. Furthermore, the recommendation may include a "penalty fare" on the leading bus 102-2 so that more intensive management may be reinforced.

Examples of the control center 106 may include (but are not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like. In these examples, the control center 106 may run different mobile web applications in its browser or operating system. One of the mobile web applications, for example, may implement the Flexible Fare (FlexiFare) Bus algorithm 110 as described above.

Although FIG. 1 illustrates a limited number of buses 102 that travel within the pre-defined bus route, the implementations described herein may apply to a multiple number of buses 102 that are travelling on different pre-defined bus routes. For example, the multiple number of buses 102 and multiple pre-defined bus routes are taken into consideration by the Flexible Fare (FlexiFare) Bus algorithm 110 in organizing and controlling bus 102 speed, boarding-passenger loads, discounted fares to be charged, etc.

Figure 2:
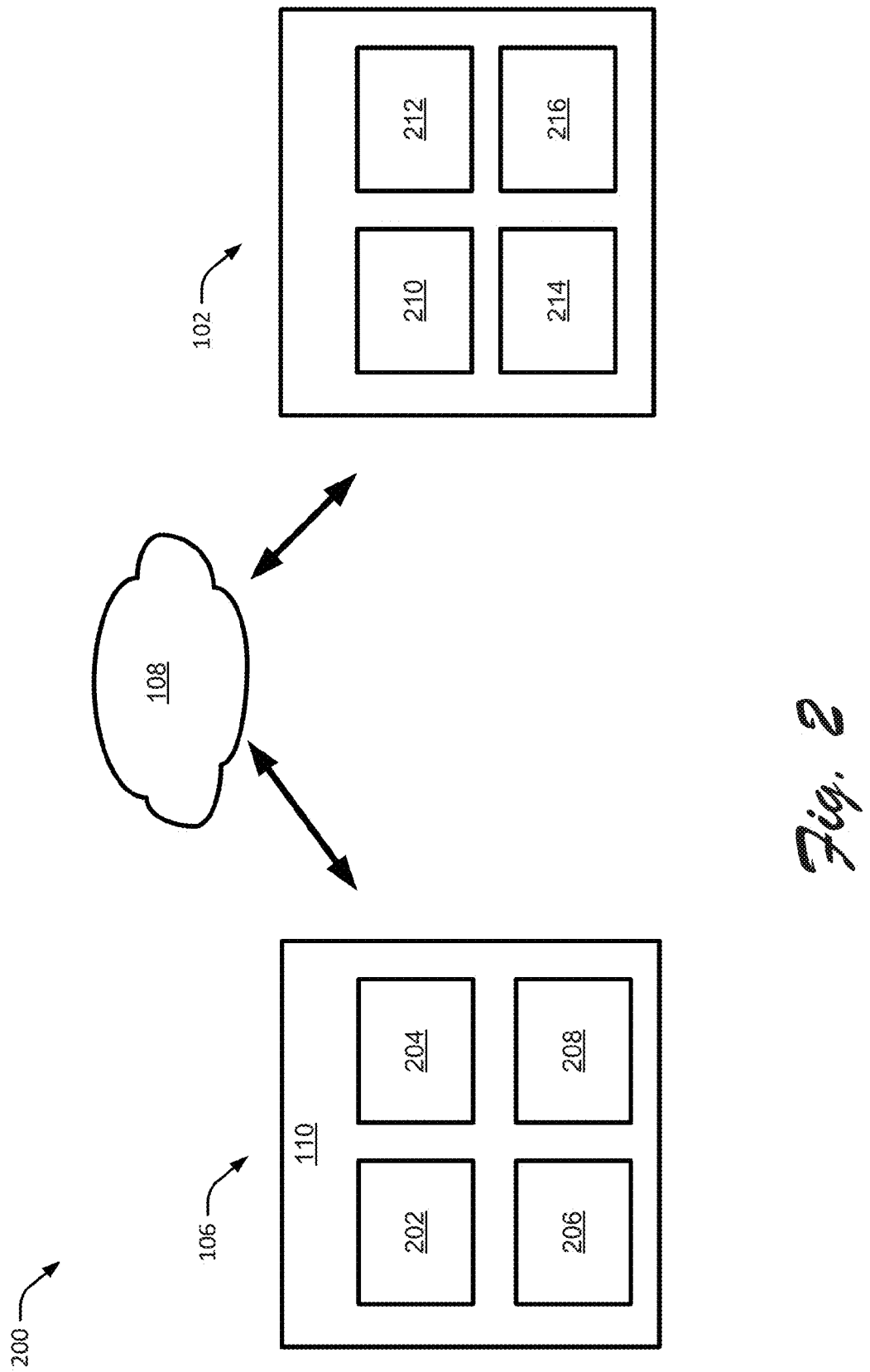
FIG. 2 illustrates an exemplary system environment as described in present implementations herein.

FIG. 2 is an example system environment 200 that implements the bus-bunching reduction scheme as described in the present implementations herein.

As shown, the system environment 200 implements the Flexible Fare (FlexiFare) Bus algorithm 110 through a bus-sensor data receiver 202, a Flexible Fare (FlexiFare) Bus processor 204, a fare-adjustment component 206, and a database 208. Furthermore, the system environment 200 implements input-data gathering at the bus 102 side through multi-sensor 210, sensor-processor 212, communication point 214 and a signal-light adjuster 216.

In an implementation, the multi-sensors 210 may include a global positioning system (GPS) sensor, speed sensor, boarding-passenger load sensor, variance to schedule sensor, and the like. For example, the GPS and speed sensors collect data that are used to detect the current location and acceleration, respectively, of the bus 102. In another example, the boarding-passenger load sensor may collect data that is used to count the number of passengers that are currently boarding the bus 102 at a particular time instant. In another example still, the variance to schedule sensor may be coupled with the GPS sensor to determine whether the bus 102 is at a desired location for the particular time instant.

Based from the data measurements from the multi-sensors 210, the sensor-processor 212 may prepare and process the data measurements for communication to the control center 106. Particularly, the communication point 214 facilitates the wireless transmission of the data through the network signal 108. For example, the network signal 108 may utilize a cellular signal to transmit or receive data signals in the present implementations as described herein.

After transmission of the data measurements at the bus side, the bus-sensor data receivers 202 at the control center 106 receives the data measurements and communicates the received data measurements to the Flexible Fare (FlexiFare) Bus processor 204.

In an implementation, the Flexible Fare (FlexiFare) Bus processor 204 initially computes a planned headway for a particular bus route, a headway-threshold for the said particular bus route, number of passengers to be allowed by each bus 102 at next stop or bus terminal station, change in bus fares, and other variables and complications that may arise during the process. The initial computation may be taken as reference points by the Flexible Fare (FlexiFare) Bus processor 204 in computing subsequent adjustment of speeds, passenger loads, etc. due to deviations in the assumed variables (e.g., heavy traffic along bus route).

For example, the Flexible Fare (FlexiFare) Bus processor 204 determines the current location of a bus 102 based upon the received GPS signal and interconnects the determined current relation to the current locations of other buses 102. Particularly, the Flexible Fare (FlexiFare) Bus processor 204 may detect bus bunching between two successive buses 102 when a determined headway is less than the headway-threshold. In an implementation, the Flexible Fare (FlexiFare) Bus processor 204 may dynamically adjust this headway-threshold for purposes of maintaining the planned headway for a particular bus route.

As described herein, the determined headway between the leading bus 102-2 and the lagging bus 102-4 is the average interval of time between the buses 102-2 and 102-4 with regard to a reference bus terminal station. In this regard, the determined headway is compared to the pre-determined headway-threshold that includes a minimum amount of determined headway before a bus bunching may occur.

If the determined headway (e.g., ten seconds) is lesser than the headway-threshold (e.g., twenty seconds), then the Flexible Fare (FlexiFare) Bus processor 204 may detect presence or occurrence of bus bunching. To this end, the Flexible Fare (FlexiFare) Bus processor 204 may further perform an algorithm for bus fare adjustment in the buses 102.

For example, in order to implement the bus fare adjustment, the Flexible Fare (FlexiFare) Bus processor 204 may determine if the following two conditions are satisfied: first, that the boarding-passenger load in the leading bus 102-2 is greater than the boarding-passenger load in the lagging bus 102-4; and second, that the boarding-passenger load in the lagging bus 102-4 is lesser than a passenger-load capacity of the lagging bus 102-4. In other words, even if the boarding-passenger load in the leading bus 102-2 is greater than the boarding-passenger load in the lagging bus 102-4, there will be no bus fare adjustment to be made if the lagging bus 102-4 has taken its full load capacity.

In an implementation, the fare-adjustment component 206 facilitates the status for different buses 102 to follow. For example, the fare-adjustment component 206 transmits to the buses 102 a signal for a yellow light, a green light, or a red light. In this example, the yellow light is a signal that indicates a normal bus fare and no bus fare adjustment is determined by the Flexible Fare (FlexiFare) Bus processor 204. On the other hand, the green light is a signal that indicates discounted bus fare where a discounted price is paid by a passenger who boards this bus in order to reduce bunching situation. The red light, in this example, is a signal that indicates higher bus fare where the bus fare is adjusted higher by the Flexible Fare (FlexiFare) Bus processor 204 to include a penalty fare; however, the lagging bus may have a discounted fare. In this situation, the passengers may be motivated to ride the lagging bus such as the bus 102-4 in the above example.

The Flexible Fare (FlexiFare) Bus processor 204 may further estimate, for example, presence of bus bunching even if the amount of the determined headway is in between the headway-threshold and the planned threshold. In this example, the determined headway is observed to be decreasing in value and the algorithm may further utilize this decreasing value in controlling the buses 102 at subsequent bus terminal stations.

In other implementations, other variations and complications may arise. For example, in multiple bus bunching, multiple buses 102 may bunch together. However, following the same principle as described above, the headway-threshold may be dynamically adjusted as the need arises. For example, the headway-threshold at a particular instant of time may not necessarily apply after a few bus terminal stations if traffic conditions, and other input variables provide data that may affect the planned headway. In this example, the Flexible Fare (FlexiFare) Bus processor 204 may compute the desired recommendations to the buses 102 in real-time to minimize bus bunching.

With continuing reference to FIG. 2, the database 208 may include an underlying High-Performance Analytic Appliance (HANA) database to store received data measurements, previous data measurements, and other variables that are needed to implement the Flexible Fare (FlexiFare) Bus algorithm. For example, the database 208 stores current and future signal lights that are recommended to different buses 102 that are plying the pre-determined bus route. In this example, the signal light adjuster 216 of the buses 102 may facilitate the signals that are displayed for the passengers' consumption.

Figure 3:
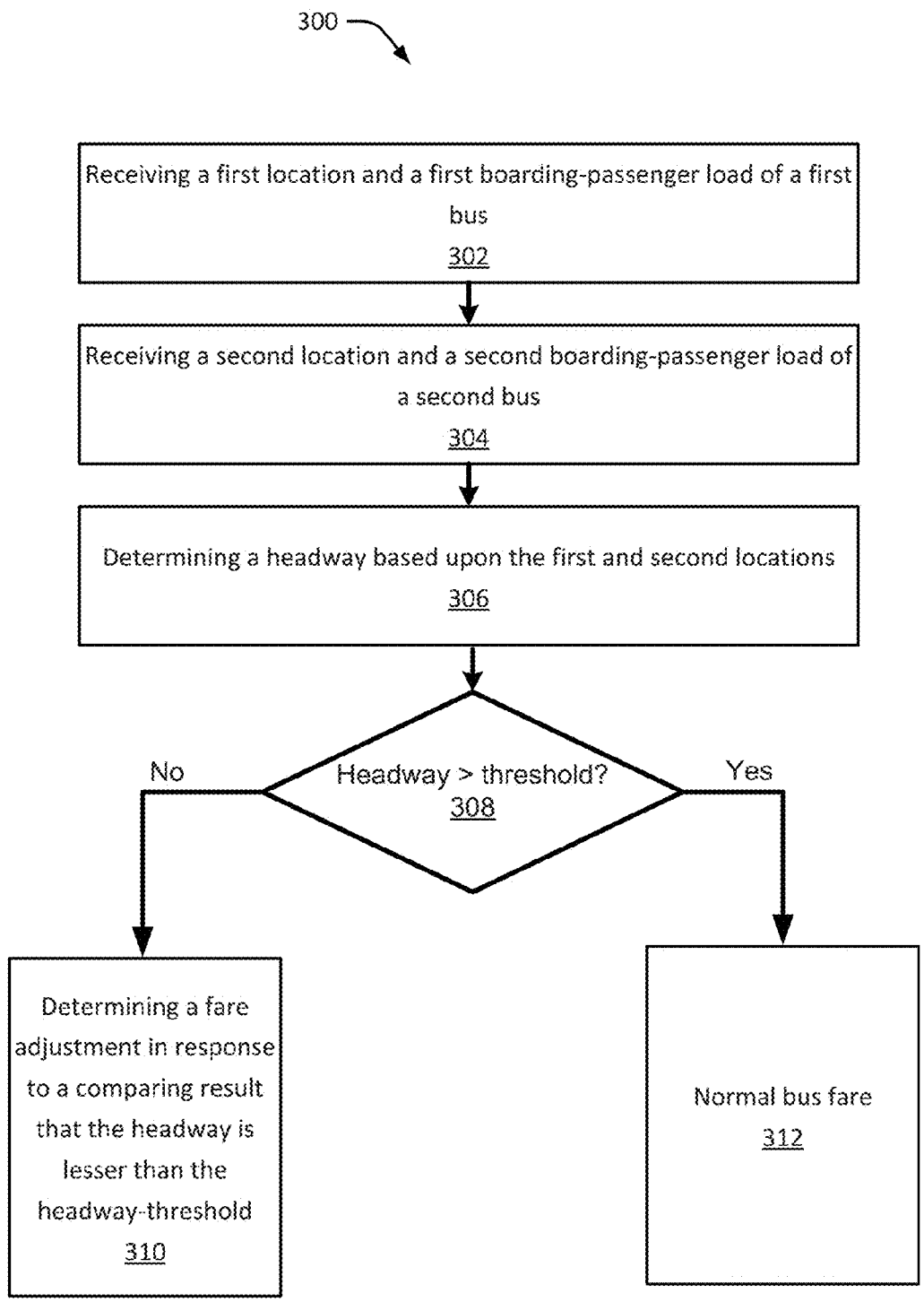
FIG. 3 illustrates an exemplary process for implementing, at least in part, the technology described herein.

FIG. 3 illustrates an exemplary process 300 for implementing, at least in part, the technology described herein. In particular, process 300 depicts a flow to implement a method of implementing a Flexible Fare (FlexiFare) Bus algorithm to reduce bus bunching in a particular bus organization. The process 300 may be performed by a computing device or devices. An exemplary architecture of such a computer device is described below with reference to FIG. 3. In this particular example, the process 300 describes that certain acts are to be performed at or by a user or a system.

At 302, receiving a first location and a first boarding-passenger load of a first bus is performed. For example, the bus-sensor data receiver 202 receives the GPS signal information and amount of boarding-passenger load of the leading bus 102-2.

At 304, receiving a second location and a second boarding-passenger load of a second bus is performed. For example, the bus-sensor data receiver 202 receives the GPS signal information and amount of boarding-passenger load of the lagging bus 102-4. In this example, the first and second locations are continuously detected with respect to a starting point and an ending point of a bus route.

At 306, determining a headway based upon the first and the second locations is performed. For example, the determined headway is the average time interval between the leading bus 102-2 and the lagging bus 102-4.

At 308, comparing the determined headway to a headway-threshold is performed. For example, if the determined headway is lesser than the headway-threshold, then at block 310, a bus bunching is detected and as such, a fare adjustment is determined. Otherwise, at block 312, normal bus fare is implemented because of absence of bus bunching.

In an implementation, the headway-threshold is dynamically adjusted to meet the planned headway. For example, although the initially determined headway-threshold may prevent the bus bunching at the particular time instant that the input variables were received, a subsequent traffic condition or delay in passenger boarding may provide a different headway-threshold. In this example, the ultimate purpose of the Flexible Fare (FlexiFare) Bus algorithm is to prevent bus bunching within a bus organization.

Figure 4:
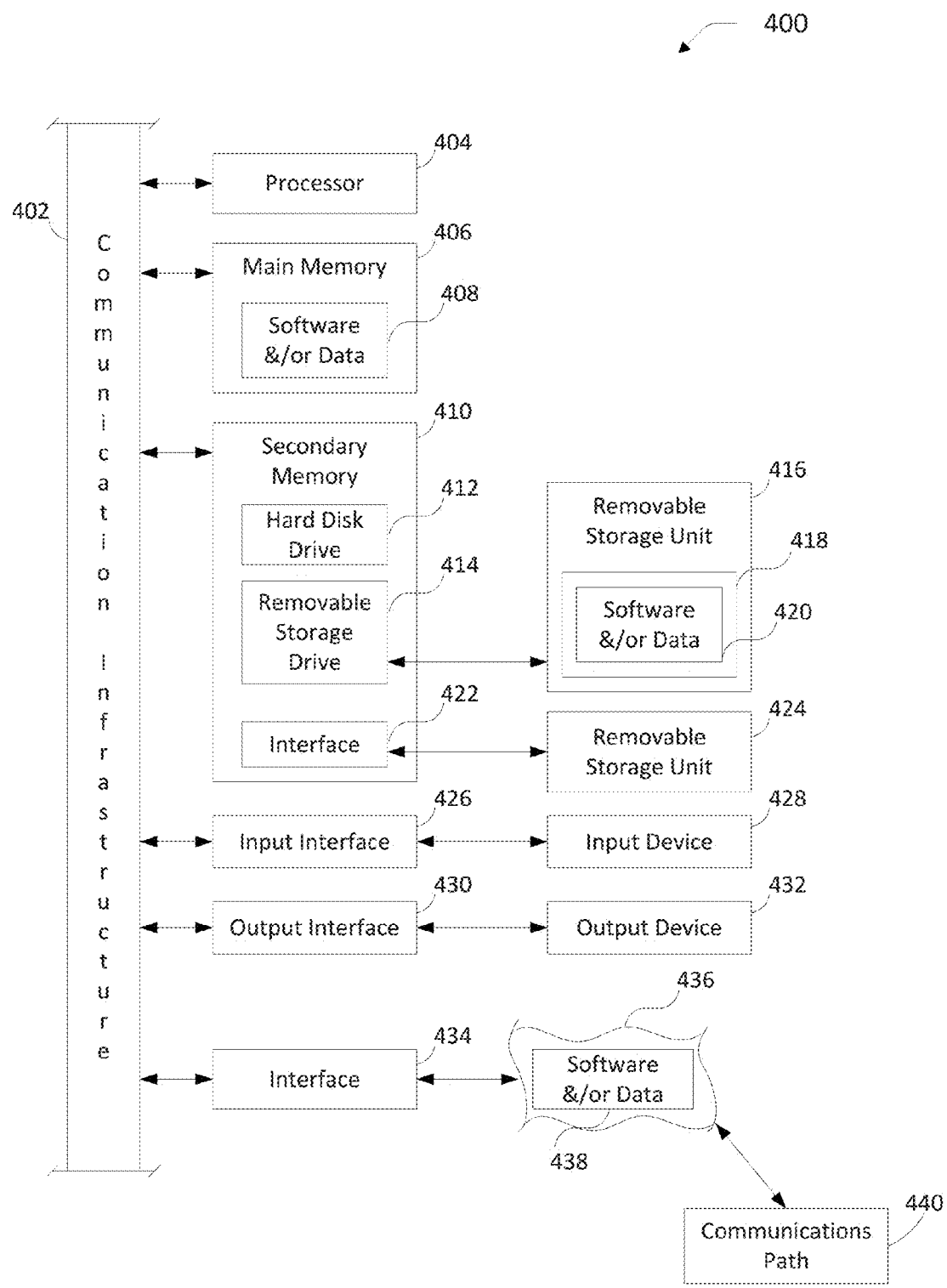
FIG. 4 illustrates an exemplary computing system to implement in accordance with the technologies described herein.

FIG. 4 illustrates an exemplary system 400 that may implement, at least in part, the technologies described herein. The computer system 400 includes one or more processors, such as processor 404. Processor 404 can be a special-purpose processor or a general-purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc. which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar means for allowing computer programs or other instructions to be loaded into computer system 400. Such means may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g. Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Exemplary implementations of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process.

Additionally, individual blocks may be deleted from the processes without departing from the spirit and scope of the subject matter described herein.

One or more exemplary implementations described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method to reduce bus-bunching comprising:
    receiving, by a bus-sensor data receiver of a server, a first location and a first boarding-passenger load of a first bus, wherein the first location is detected by a first global positioning system (GPS) device installed in the first bus, and the first boarding-passenger load is detected by a first load sensor installed in the first bus;
    receiving, by the bus-sensor data receiver of the server, a second location and a second boarding-passenger load of a second bus, wherein the second location is detected by a second GPS device installed in the second bus, and the second boarding-passenger load is detected by a second load sensor installed in the second bus;
    determining, by the server, a headway based upon the first and the second locations;
    comparing, by the server, the headway to a headway-threshold to determine a headway comparing result, wherein the headway threshold comprises a minimum determined headway before a bus-bunching occurrence;
    comparing, by the server, the first and second boarding-passenger loads to determine a load comparing result;
    determining, by the server, a passenger fare adjustment in response to the headway comparing result that the determined headway is lesser than the headway-threshold and in response to the load comparing result; and
    transmitting, by the server, a signal to automatically activate signal lights on the first and second buses to indicate the passenger fare adjustment.

2. The method according to claim 1, wherein the determining of the passenger fare adjustment further comprises:
    determining the first boarding-passenger load to be greater than the second boarding-passenger load; and
    determining the second boarding-passenger load to be lesser than a passenger-load capacity of the second bus.

3. The method according to claim 1, wherein the first and second locations are continuously detected with respect to a bus terminal station.

4. The method according to claim 1, wherein the first and second locations are continuously detected with respect to a starting point and an ending point of a bus route, wherein the bus route comprises a plurality of bus terminal stations.

5. The method according to claim 1, wherein the first and second locations are continuously detected with respect to an approaching bus terminal station.

6. The method according to claim 1, wherein the determined headway is based upon an average interval of time difference between the first bus and the second bus that are running on the same direction and route.

7. The method according to claim 1 further comprising receiving an input road and traffic condition, wherein the headway-threshold is adjusted based upon the received input road and traffic condition.

8. The method according to claim 1 further comprising determining a planned-headway that includes an ideal average interval of time difference between the first bus and the second bus in a normal operation, wherein the planned-headway is utilized as a reference point in a dynamic adjustment of the headway-threshold.

9. A device comprising:
    a bus-sensor data receiver that receives a first location and a boarding passenger load of a first bus, wherein the bus-sensor data receiver further receives a second location and a second boarding-passenger load of a second bus, wherein the first and second locations are detected by global positioning system (GPS) devices installed in the first and second buses, and the first and second boarding-passenger loads are detected by load sensors installed in the first and second buses;
    a Flexible Fare Bus processor that determines a headway based on the received first and second locations, wherein the Flexible Fare Bus processor compares the determined headway to a headway-threshold to determine a headway comparing result, wherein the headway-threshold comprises a minimum determined headway before a bus-bunching occurrence, and wherein the Flexible Fare Bus processor compares the first and second boarding-passenger loads to determine a load comparing result; and
    a passenger fare-adjustment component that transmits a signal to automatically activate a signal light on the first or second bus to indicate a passenger bus fare, wherein the passenger bus fare comprises a determined penalty passenger bus fare that has been adjusted higher in response to the headway comparing result that the determined headway is lesser than the headway-threshold and in response to the load comparing result.

10. The device according to claim 9, wherein the Flexible Fare Bus processor further determines the passenger fare adjustment, the determination comprises:
    determining the first boarding-passenger load to be greater than the second boarding-passenger load; and
    determining the second boarding-passenger load to be lesser than a passenger load capacity of the second bus.

11. The device according to claim 9, wherein the first and second locations are continuously detected with respect to a bus terminal station.

12. The device according to claim 9, wherein the first and second locations are continuously detected with respect to a starting point and an ending point of a bus route, wherein the bus route comprises a plurality of bus terminal stations.

13. The device according to claim 9, wherein the determined headway is based upon an average interval of time difference between the first bus and the second bus that are running on the same direction and route.

14. One or more non-transitory computer-readable media storing processor-executable instructions that when executed cause one or more processors to perform operations comprising:
    receiving by a bus-sensor data receiver of a server a first global positioning system (GPS) location and a first boarding-passenger load of a first bus, wherein the first GPS location is detected by a first global positioning system (GPS) device installed in the first bus and the first boarding-passenger load is detected by a first load sensor installed in the first bus;

receiving, by the bus-sensor data receiver of the server, a second GPS location and a second boarding-passenger load of a second bus, wherein the second GPS location is detected by a second GPS device installed in the second bus, and the second boarding-passenger load is detected by a second load sensor installed in the second bus;

determining, by the server a headway based upon the first and the second GPS locations;

comparing by the server the headway to a headway-threshold to determine a headway comparing result, wherein the headway-threshold is dynamically adjusted to include a minimum determined headway before a bus-bunching occurrence;

comparing, by the server, the first and second boarding-passenger loads to determine a load comparing result;

determining by the server a passenger fare adjustment in response to the headway comparing result that the determined headway is lesser than the headway-threshold and in response to the load comparing result; and transmitting, by the server, a signal to automatically activate signal lights on the first and second buses to indicate the passenger fare adjustment.

15. The one or more non-transitory computer-readable media according to claim 14, wherein the determining of the passenger fare adjustment further comprises:

determining the first boarding-passenger load to be greater than the second boarding-passenger load; and determining the second boarding-passenger load to be lesser than a passenger load capacity of the second bus.

16. The one or more non-transitory computer-readable media according to claim 14, wherein the first and second GPS locations are continuously detected with respect to a bus terminal station.

17. The one or more non-transitory computer-readable media according to claim 14, wherein the first and second GPS locations are continuously detected with respect to a starting point and an ending point of a bus route, wherein the bus route comprises a plurality of bus terminal stations.

18. The one or more non-transitory computer-readable media according to claim 14, wherein the determined headway is based upon an average interval of time difference between the first bus and the second bus that are running on the same direction and route.

* * * * *